US008698413B1

(12) United States Patent
Godyak et al.

(10) Patent No.: US 8,698,413 B1
(45) Date of Patent: Apr. 15, 2014

(54) RF INDUCTION LAMP WITH REDUCED ELECTROMAGNETIC INTERFERENCE

(71) Applicant: Lucidity Lights, Inc., Cambridge, MA (US)

(72) Inventors: Valery A. Godyak, Brookline, MA (US); Jakob Maya, Brookline, MA (US); James N. Lester, Essex, MA (US)

(73) Assignee: Lucidity Lights, Inc., Cambridge, MA (US)

( * ) Notice: Subject to any disclaimer, the term of this patent is extended or adjusted under 35 U.S.C. 154(b) by 0 days.

(21) Appl. No.: 13/684,665

(22) Filed: Nov. 26, 2012

(51) Int. Cl.
*H05B 41/16* (2006.01)

(52) U.S. Cl.
USPC ........... 315/248; 315/267; 315/278; 315/344; 315/285; 315/58; 315/62; 313/34; 313/493; 313/576

(58) Field of Classification Search
USPC ......... 315/248, 267, 278, 344, 291, 246, 285, 315/56–58, 61, 62; 313/34, 484, 485, 493, 313/571, 576
See application file for complete search history.

(56) References Cited

U.S. PATENT DOCUMENTS

| 3,521,120 | A |   | 7/1970  | Anderson          |         |
|-----------|---|---|---------|-------------------|---------|
| 4,010,400 | A |   | 3/1977  | Hollister         |         |
| 4,219,760 | A |   | 8/1980  | Ferro             |         |
| 4,568,859 | A |   | 2/1986  | Houkes et al.     |         |
| 4,710,678 | A |   | 12/1987 | Houkes et al.     |         |
| 4,727,294 | A |   | 2/1988  | Houkes et al.     |         |
| 4,977,354 | A |   | 12/1990 | Bergervoet et al. |         |
| 5,200,672 | A | * | 4/1993  | Sheynberg et al.  | 315/248 |
| 5,239,238 | A | * | 8/1993  | Bergervoet et al. | 315/248 |
| 5,325,018 | A |   | 6/1994  | El-Hamamsy        |         |
| 5,387,850 | A |   | 2/1995  | Bray et al.       |         |
| 5,404,082 | A |   | 4/1995  | Hernandez et al.  |         |
| 5,412,280 | A |   | 5/1995  | Scott et al.      |         |
| 5,446,350 | A |   | 8/1995  | El-Hamamsy et al. |         |
| 5,461,284 | A |   | 10/1995 | Roberts et al.    |         |
| 5,465,028 | A |   | 11/1995 | Antonis et al.    |         |
| 5,621,266 | A | * | 4/1997  | Popov et al.      | 313/46  |
| 5,796,214 | A |   | 8/1998  | Nerone            |         |
| 5,808,414 | A |   | 9/1998  | Wharmby et al.    |         |
| 5,825,130 | A | * | 10/1998 | Nerone et al.     | 313/635 |
| 5,834,905 | A | * | 11/1998 | Godyak et al.     | 315/248 |
| 5,841,229 | A |   | 11/1998 | Borowiec et al.   |         |
| 5,866,991 | A |   | 2/1999  | Farkas et al.     |         |
| 5,886,472 | A |   | 3/1999  | Alexandrovich et al. |      |
| 5,952,792 | A |   | 9/1999  | Borowiec et al.   |         |

(Continued)

OTHER PUBLICATIONS

ANSI, "American National Standard—for electric lamps, A,G,PS, and Similar Shapes with E26 Medium Screw Bases", ANSI C78.20/2003, 2003, 48 pages.

(Continued)

*Primary Examiner* — Haiss Philogene
(74) *Attorney, Agent, or Firm* — GTC Law Group LLP & Affiliates (57) ABSTRACT

An induction RF fluorescent lamp configuration provides reduced EMI, including a lamp envelope with a re-entrant cavity both covered on the partial vacuum side with phosphor and filled with a working gas mixture, a tubular ferromagnetic core on the non-vacuum side said re-entrant cavity wound directly on the said core with two windings having different numbers of turns, a first active winding having one end connected to an RF ballast and the other end connected to local ground, and a second passive winding having one end grounded and the other end free.

6 Claims, 5 Drawing Sheets

(56) References Cited

U.S. PATENT DOCUMENTS

| | | | |
|---|---|---|---|
| 5,994,848 A | 11/1999 | Janczak | |
| 6,081,070 A * | 6/2000 | Popov et al. | 313/490 |
| 6,084,359 A | 7/2000 | Hetzel et al. | |
| 6,288,490 B1 * | 9/2001 | Popov | 313/607 |
| 6,348,767 B1 | 2/2002 | Chen et al. | |
| 6,392,366 B1 | 5/2002 | Nerone | |
| 6,433,493 B1 | 8/2002 | Ilyes et al. | |
| 6,762,550 B2 | 7/2004 | Itaya et al. | |
| 7,049,763 B2 * | 5/2006 | Hochi et al. | 315/248 |
| 7,119,486 B2 | 10/2006 | Godyak et al. | |
| 7,180,230 B2 | 2/2007 | Godyak et al. | |
| 7,459,856 B1 | 12/2008 | Wursching et al. | |
| 7,753,558 B2 | 7/2010 | Ribarich | |
| 7,812,544 B2 | 10/2010 | Morales et al. | |
| 7,822,514 B1 | 10/2010 | Erickson | |
| 8,035,318 B2 | 10/2011 | Bobel | |

OTHER PUBLICATIONS

ANSI, "American National Standard—for electric lamps, PAR and R Shapes", ANSI 078.21/2003, 2003, 48 pages.

Nerone, Louis R., "A Novel Ballast for Electrodeless Fluorescent Lamps", Conference Record of the 2000 IEEE Industry Applications Conference, vol. 5, 2000, pp. 3330-3337.

* cited by examiner

RF INDUCTION LAMP WITH REDUCED ELECTROMAGNETIC INTERFERENCE

BACKGROUND

1. Field

This invention relates to RF induction light sources, and more particularly to the suppression of electromagnetic interference in RF induction light sources.

2. Description of Related Art

The issue of electromagnetic interference (EMI) inflicted by any industrial and consumer product utilizing RF power is the subject of strict domestic and international regulations. According to these regulations, the EMI level emanating from RF light sources must not exceed some threshold value that may interfere with operation surrounding electronic devices, communication, remote control gadgets, medical equipment and life supporting electronics. The permitted EMI level for consumer lighting devices is relaxed at frequencies around 2.65 MHz, but the increase in allowable EMI is limited and EMI still has to be addressed to comply with the regulations.

The conductive EMI of an RF light source (also referred herein as an RF lamp or lamp) is originated by the lamp RF potential $V_p$ on the lamp surface inducing an RF current $I_g$ to the ac line as displacement RF current through the lamp capacitance C to outer space (ground) according to the expression:

$$I_g = V_p 2\pi f C$$

where: $V_p$ is the lamp surface RF potential, and f is the lamp driving frequency. The lamp capacitance can be evaluated in the Gaussian system as equal to the lamp effective radius R, C=R in cm or in the CI system as 1.11 R in pF. For an RF lamp size of A19 this capacitance is estimated as about 4 pF; that results in $V_p$=1 V corresponding to existing regulation limit at 2.65 MHz.

The value of the lamp RF potential $V_p$ is defined by capacitive coupling between RF carrying conductors (mainly the winding of the lamp coupler and associated wire leads) and the lamp re-entrant cavity housing the lamp coupler.

The EMI compliance is especially problematic for integrated, self-ballasted compact RF lamps. The requirements for these compact RF lamps are much stronger, since they are connected to ac line directly through a lamp socket and have no special dedicated contact to the ground, as is the case for powerful RF lamps having remote grounded ballasts.

The effective way to reduce the RF lamp potential is using a bifilar coupler winding consisting of two equal length wire windings wound in parallel, and having their grounded ends on the opposite sides of the coupler.

The essence of this technique is the RF balancing of the coupler with two non-grounded wires on the coupler ends having equal RF potential but opposite phase. Such balancing of the coupler provides the compensation of the opposite phase voltages induced on the re-entrant cavity surface, and thus, on the plasma and the lamp surface.

Although this technique for reduction of conductive EMI has significantly reduced the lamp RF voltage and has been implemented in many commercial RF induction lamps, it appeared that is not enough to comply with the regulation. Some additional means are needed to farther reduce the EMI level to pass the regulations.

A variety of EMI suppression means have been proposed and many of them have been implemented in the market through introduction of RF compact fluorescent lamps, such as a segmented electrostatic shield between the coupler and re-entrant cavity to reduce conductive EMI, a light transparent conductive coating placed between the lamp glass and phosphor, and an external metal conductive coating for lamp partial RF screening.

An alternative (to bifilar winding) way to balance RF coupler has been proposed for RF balancing the coupler by winding on it two wires in the azimuthally opposite directions and to drive such coupler with a symmetrical (push-pull) output ballast. Although the degree of RF compensation in the coupler balancing is expected to be higher than that at bifilar winding, the proposed scheme of compensation has many disadvantages that offset its positive expectation. Probably for this reason, this proposed way of EMI reduction has never been used in commercial products.

The considered above means for EMI reduction are associated with reduction in lamp light output and considerable RF lamp complexity and thus, increased cost.

Another solution of the EMI problem has been proposed that, instead of a complicated shielding of the entire lamp, involves a combination of a bifilar symmetric winding with screening of the RF wire connecting the coupler with ballast by a braided shield. This measure appeared to be enough to pass EMI regulation, yet resulted in considerable gain in lamp efficiency and the lamp simplification.

It would be an advance in the art of EMI reduction of inductive RF fluorescent lamps if one could further improve the EMI shielding at reasonable cost to allow more usage in commercial and residential applications.

SUMMARY

The exemplary embodiments that follow provide an RF induction lamp with simple and low cost means for suppressing electromagnetic interference. This goal may be achieved by a bifilar winding of the lamp coupler having unequal winding wire lengths and by effective grounding of the coupler ferromagnetic core with a conductive foil shell inserted into the coupler ferromagnetic core. This inexpensive solution may reduce the conductive electromagnetic interference (EMI) level sufficiently to pass all existing regulations on such interference with significant reserve.

In view of the limitations now present in the related art, a new and useful RF inductive lamp with simplified and effective means for conductive EMI suppression without lamp RF screening and shielding RF wiring is provided.

In accordance with exemplary and non-limiting embodiments, the lamp coupler may be wound with a bifilar winding having unequal number of turns, in such a way that additional turns of the passive winding compensates the capacitive coupling (to the lamp re-entrant cavity) of the RF connecting wire of the active winding. Due to opposite phases of RF voltages on the non-grounded ends of active and passive windings, the compensation takes place when the induced RF capacitive currents of opposite phase on the re-entrant cavity are equal to each other.

In accordance with exemplary and non-limiting embodiments, a grounded foil shell (tube) may be inserted into the tubular ferromagnetic core of the coupler to reduce the coupler uncompensated common mode RF potential. Due to large shell surface contacting with the core and a very large dielectric constant (or large electrical conductivity) of ferromagnetic materials, the RF potential of the coupler and thus the conductive EMI created by RF lamp may be significantly reduced.

In accordance with exemplary and non-limiting embodiments, the radial position of the coupler may be fixed inside the re-entrant cavity to prevent its direct mechanical contact to the coupler, which tends to dramatically increase capacitive coupling and thus, conductive EMI. To provide a minimal capacitive coupling to re-entrant cavity, the air gap between the coupler and re-entrant cavity may need to be fixed and equal over all surface of the coupler. Such fixation may be realized with increased coupler diameter on its ends with an additional bonding, a ring spacer set on the coupler ends, and the like.

In accordance with exemplary and non-limiting embodiments, a spatially stable position of the connecting RF wire in the volume out of the ballast case may be provided by mechanical fixing the wires on the lamp inside body. Such measure would keep the RF connecting wire capacitance to re-entrant cavity to be fixed and permanent in one position during lamp assembling and reassembling.

These and other systems, methods, objects, features, and advantages will be apparent to those skilled in the art from the following detailed description of exemplary and non-limiting embodiments and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

While described in connection with certain exemplary and non-limiting embodiments, other exemplary embodiments would be understood by one of ordinary skill in the art and are encompassed herein. It is therefore understood that, as used herein, all references to an "embodiment" or "embodiments" refer to an exemplary and non-limiting embodiment or embodiments, respectively.

DETAILED DESCRIPTION

Figure 1:
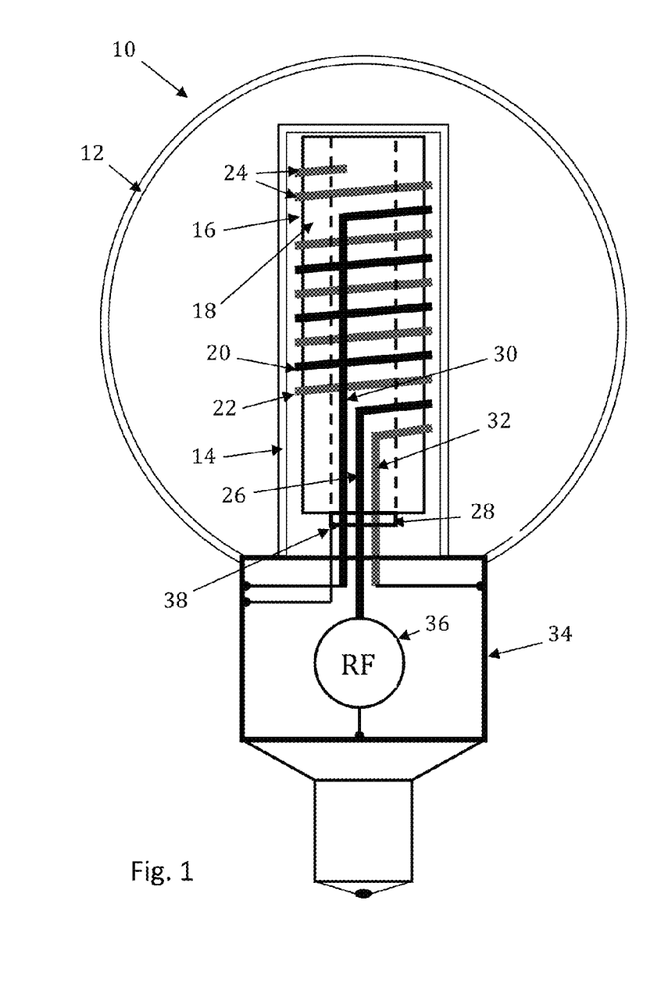
FIG. 1 depicts an exemplary embodiment cross-section view of an RF induction lamp.

FIG. 1 illustrates a cross-section view of an inductive RF lamp in accordance with an exemplary and non-limiting embodiment. The RF lamp 10 comprises of a glass envelope 12 with a glass re-entrant cavity 14 sealed into the envelope 12 and forming a gas discharge vessel (burner) between them. The lamp burner is filled with a working gas mixture of a noble gas such as Argon, Krypton or others and Mercury vapor. The inner surface of burner, both the envelope 12 and the re-entrant cavity 14, are covered with a phosphor. With plasma discharge maintained in the burner, the UV radiation from plasma excites the phosphor, which converts UV light to visible light.

The plasma within the burner is maintained by the electromagnetic induction created by the RF lamp coupler 16 sitting inside the re-entrant cavity 14. The coupler 16 is energized by an RF power source (RF ballast) 36 placed in the ballast cap 34 and electrically connected to the local ground (buss), where the ballast cap 34 may be either conductive or non-conductive. The coupler 16 consists of a tubular ferromagnetic core that may be a ferrite with high magnetic permeability $\mu \gg 1$, such as where $\mu$ is between 20 and 2000. For the frequency of 2.65 MHz allocated for RF lighting, the preferred material may be Ni—Zn ferrite with permeability $\mu$ around 100 having high Curie temperature $T_c > 300°$ C.

Two windings 20 and 22 may be bifilarly wound either directly on the core 18, or with any form or spool between them. The first active winding 20 is connected to the ballast 36 with its RF end 26 and its grounded end 30. RF current in this winding creates RF magnetic induction in the core that in turn induces an electromotive force (emf) that maintains the discharge plasma in the lamp burner.

The second, passive, winding 22 has the function only of inducing the opposite (reference to the first winding 20) phase voltage on the coupler 18, (thereby reducing the lamp conductive EMI). The passive winding 22 may be connected to the ballast 36 only with its grounded end wire 32, leaving its RF end free.

In embodiments, the number of turns of the passive winding 22 may not be equal to that of the active winding 20. Excess turns 24 (it could be one or more turns, or a fraction of a turn) may be added to the passive winding. The purpose for addition of these excess turns 24 is to create some additional (opposite phase) RF capacitive current to the re-entrant cavity, to compensate that induced by the RF leads 26 of the active winding.

The general condition of such compensation (the equality of RF current induced with opposite phase) is:

$$\int_0^{L_1} C_1(x) V_1(x) \, dx = \int_0^{L_2} C_2(x) V_2(x) \, dx$$

Here, the integration is along the wire path x. $C_1$ and $C_2$ are the distributed capacitances correspondingly along the active winding connecting wire 26 and the passive additional winding 24; $V_1$ and $V_2$ are correspondingly, the distributed RF potentials along the wires, and $L_1$ and $L_2$ are correspondingly, the length of the connecting and additional winding wire.

Note that due to the three-dimensional structure of the RF lamp, with arbitrary RF wire positions, it is extremely difficult to calculate the functionalities $C_1(x)$ and $C_2(x)$. Therefore, the proper number of turns in the additional passive winding 24 may have to be found empirically for a specific RF lamp embodiment.

Figure 2:
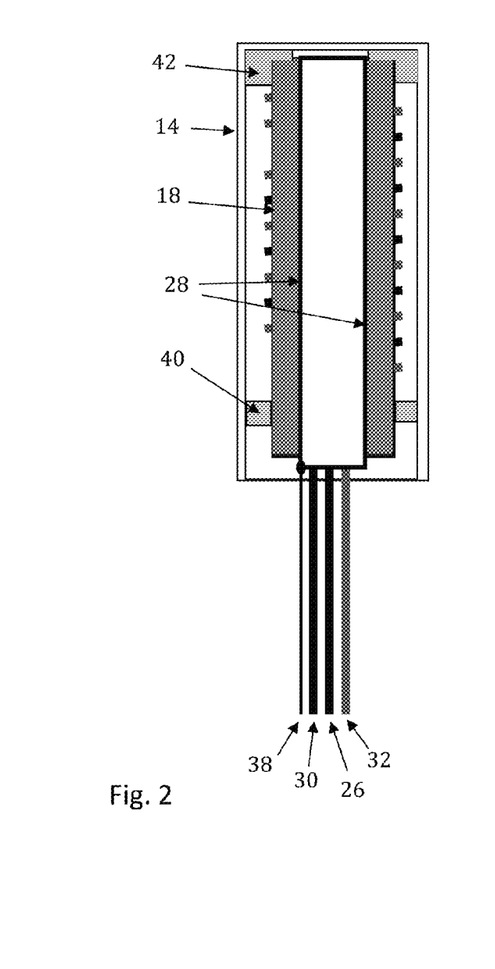
FIG. 2 depicts an exemplary embodiment cross-section view of a coupler with the inserted grounded shell.

To farther reduce the common mode RF potential of the coupler 16 due to its imperfect balancing, a grounded conductive foil shell (tube) 28 may be inserted into the tubular ferrite core 18 of the coupler 16. Due to the shell's large surface, its close contact to the inner surface of the core 18, and a very high ferrite core dielectric constant (or/and its high conductivity), the coupler RF potential reference to local ground is considerably reduced, and thus, conductive EMI in the RF lamp.

The shell 28 inserted into the core 18 may be made of a conductive foil, such as copper foil, aluminum foil, and the like. It may be made as a closed tube, have a slot along its axial direction, and the like. In the latter case, the shell may operate as a spring assuring a good mechanical contact with the inner surface of the core. The length of the shell may be equal, or somewhat longer or shorter than the length of the coupler. A larger contacting surface between the shell and the coupler will provide better grounding. On the other hand, a shell length shorter than that of coupler may be enough for adequate coupler grounding.

Grounding of the coupler with the inserted conductive shell has a certain advantage compared to grounding with an external conductive patch. Contrary to an external patch, the internal shell may not increase inter-turn capacitance and may not induce eddy current in the shell. Both these effects diminish the coupler Q-factor and consequently increase power loss in the coupler. The absence of an eddy current in the inserted shell is due to the fact that RF magnetic lines in the coupler are parallel to the shell and are diverging on the coupler ends, thus they are not crossing the foil surface.

To prevent the coupler 16 from touching the re-entrant cavity 14, and thereby increasing conductive EMI, the coupler may need to be fixed in the approximate center and approximately equidistant of the re-entrant cavity as it is shown in FIG. 2. This may be done with a pair of spacers 40 and 42 placed correspondingly on the bottom and the upper ends of the coupler 16. It may be advantageous to have an air gap between the coupler 16 and re-entrant cavity 14 rather than filling this space with some capsulation material having a high dielectric constant, e>>1. In the latter case, the capacitive coupling of the coupler winding to the re-entrant cavity would increase by e times. Since in practice, it is impossible to reach the ideal RF balancing of the coupler, its residual common mode potential (and so EMI level) would be e times larger than that with air gap. It is found empirically that the gap between coupler windings and inner surface of re-entrant cavity of approximately 0.5-1.5 mm is enough for embodiments of the RF lamp to pass EMI regulations. Although, increasing of the air gap reduces conductive EMI, the inductive coupling efficiency and lamp starting would be deteriorated.

It was found in many experiments with non-shielded RF wire 26 connecting the coupler 16 to ballast 36, the conductive EMI level is extremely sensitive to the spatial position of this wire within the lamp body. An arbitrary position of this wire after the lamp assembling may diminish the effect of the measures described above towards EMI reduction in the RF lamp. Therefore, a wire fixing on some lamp inner elements may be necessary. Note that wire fixing may be needed only in the space between the coupler 16 and the grounded ballast case 34. The position of the wires inside the ballast case may not be important for conductive EMI.

As it seen in FIGS. 1 and 2, four wires 26, 30, 32 and 38 may couple the coupler to the ballast. Indeed, in this embodiment, three of them, 30, 32 and 38 are grounded within the ballast case, and the forth is connected to the output of the RF ballast 36. Practically, only the positioning of the RF wire 26 is important for EMI issue, but the grounded wires 30 and 32 being positioned on both side of the RF wire 26 (as it shown in FIGS. 1 and 2) partially perform a shielding function reducing the sensitivity of conductive EMI level to RF wire position. For this purpose, the wires 30, 32 and between them wire 26 may be fixed together (touching each other with minimal distance between them) on the inner lamp body, such as with some painting, a sticky tape, and the like.

Numerous experiments conducted in our laboratories showed that the exemplary embodiments considered herein are effective and inexpensive ways to address conductive EMI in an RF lamp.

Experimental Results

Evaluation of conductive EMI levels of the exemplary embodiments described herein has been done by measurement of the lamp surface voltage Vp, which is proportional to EMI level. For instance, the maximum value of Vp corresponding to the regulation threshold for RF lamp of size A19 at 2.65 MHz, is 2.8 Volt peak-to-peak.

Figure 3:
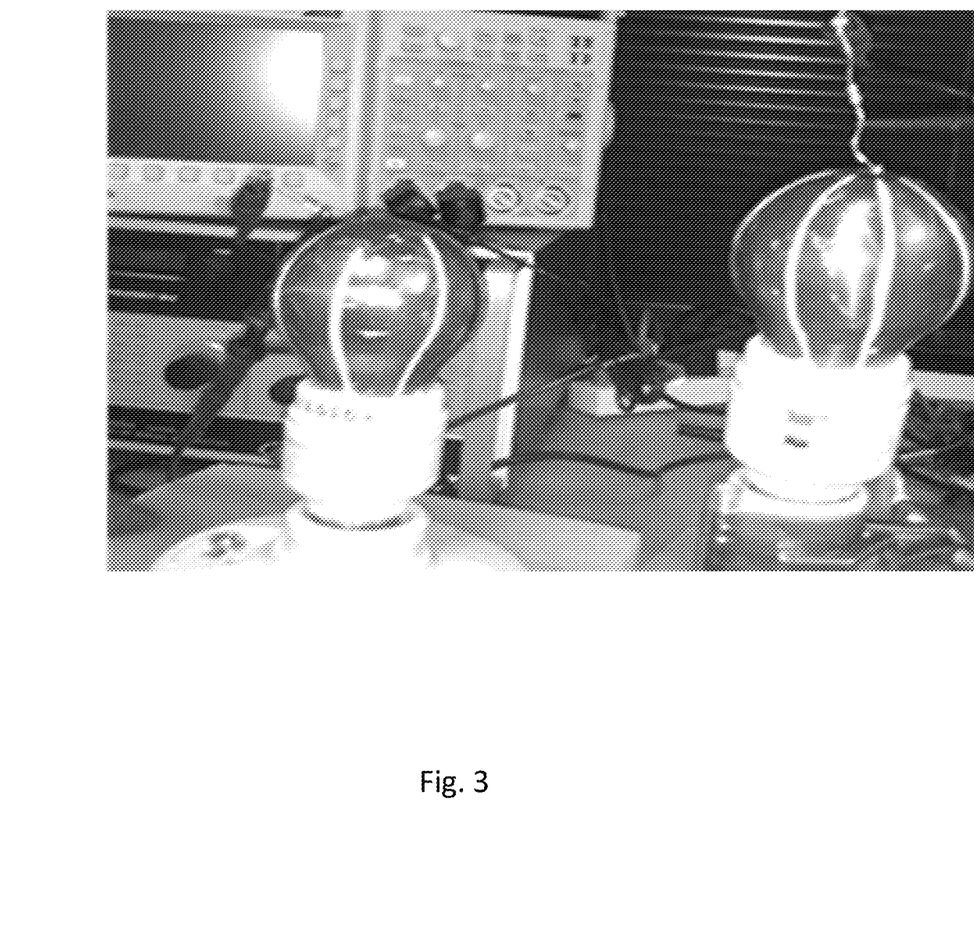
FIG. 3 shows an exemplary experimental and commercial lamp covered with copper foil.

To measure the Vp values, the lamp glass envelope was entirely covered with thin copper foil as it shown in FIG. 3 The foil jacket had 8 meridian slots to prevent its interaction with the lamp RF magnetic field. The capacitance between the foil and plasma inside the lamp burner was estimated as a few hundred pF that was much larger than the input capacitance (8 pF) of the RF probe connected between the foil and a scope.

Figure 4:
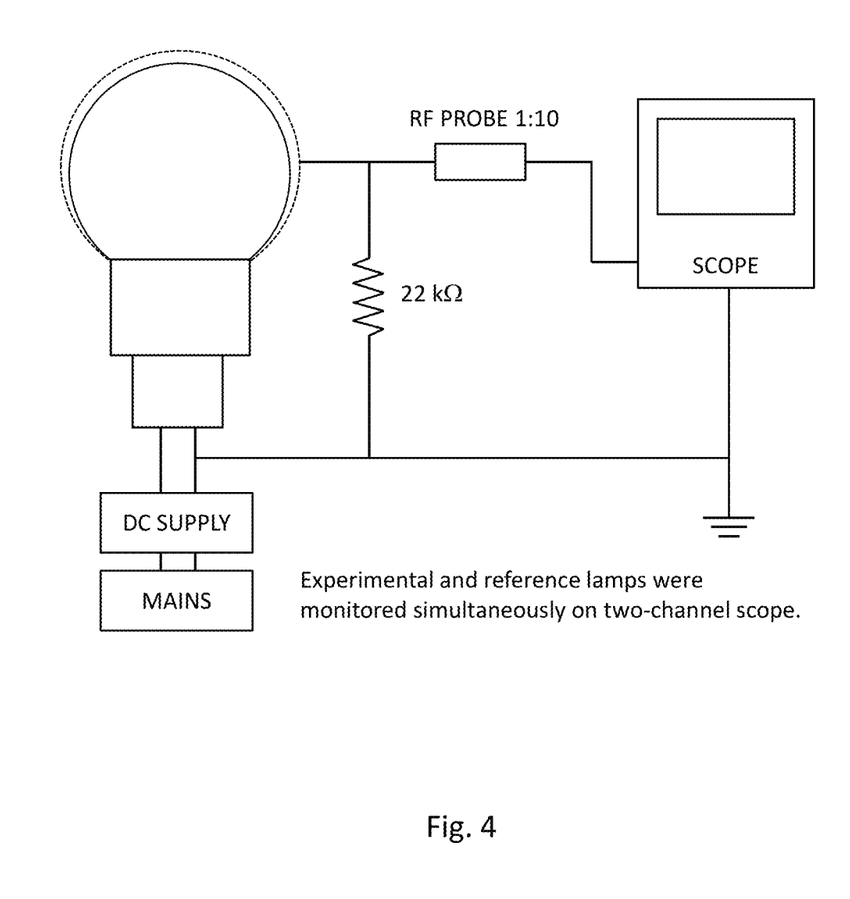
FIG. 4 illustrates an exemplary experimental set-up for measurement of the lamp surface voltage.

Concurrently, a similar measurement has been done with a commercial lamp having the same size of A19 (6 cm diameter), where the intent was to compare EMI performance of the commercial lamp to a lamp constructed consistent with exemplary embodiments described above. Since results of measurements were dependant on lamp run-up time, the measurement for both lamps were performed at the same time with a two-channel oscilloscope. The experimental set-up for measurement of the lamp surface voltage Vp is shown in FIG. 4. The resistor 22 kΩ is to prevent a line frequency interference with the measurement of small RF voltages. The overall test set up was provided by the international standard on EMI test equipment, CISPR 16. Power was provided to the test lamp through a Line Impedance Stabilization Network (LISN). This network collected the EMI noise on each power line (120V and Neutral) and routed the collected EMI to a measurement analyzer. In this case, a spectrum analyzer that was specifically designed for EMI measurements was used.

In the U.S., the Federal Communications Commission (FCC) writes the rules for EMI compliance. These lamps are required to comply with FCC Part 18. There are several compliance requirements including technical and non-technical requirements, but only the FCC-specified residential market limits for EMI were used in this coupler comparison. Testing of the noise on the power line was done over the range of frequencies from 450 kHz to 30 MHz in accordance with FCC Part 18 requirements. The lamps were mounted in an open-air fixture with their bases oriented downward. The warm up times from a cold turn-on were kept the same at one hour. A peak detector (PK) was used to speed up the testing. The plots of measured data show limit lines that apply when a quasi-peak detector (QP) is used. For this lamp, QP data is typically 3 dB lower than the PK data. So if the PK data is below the limit line, the QP data will be even lower and doesn't need to be measured. Typically in EMI testing, PK data is recorded initially, and QP data is measured if the PK data is near or over the limit line. For this comparison task, measuring PK data allows the two couplers to be compared.

Figure 5:
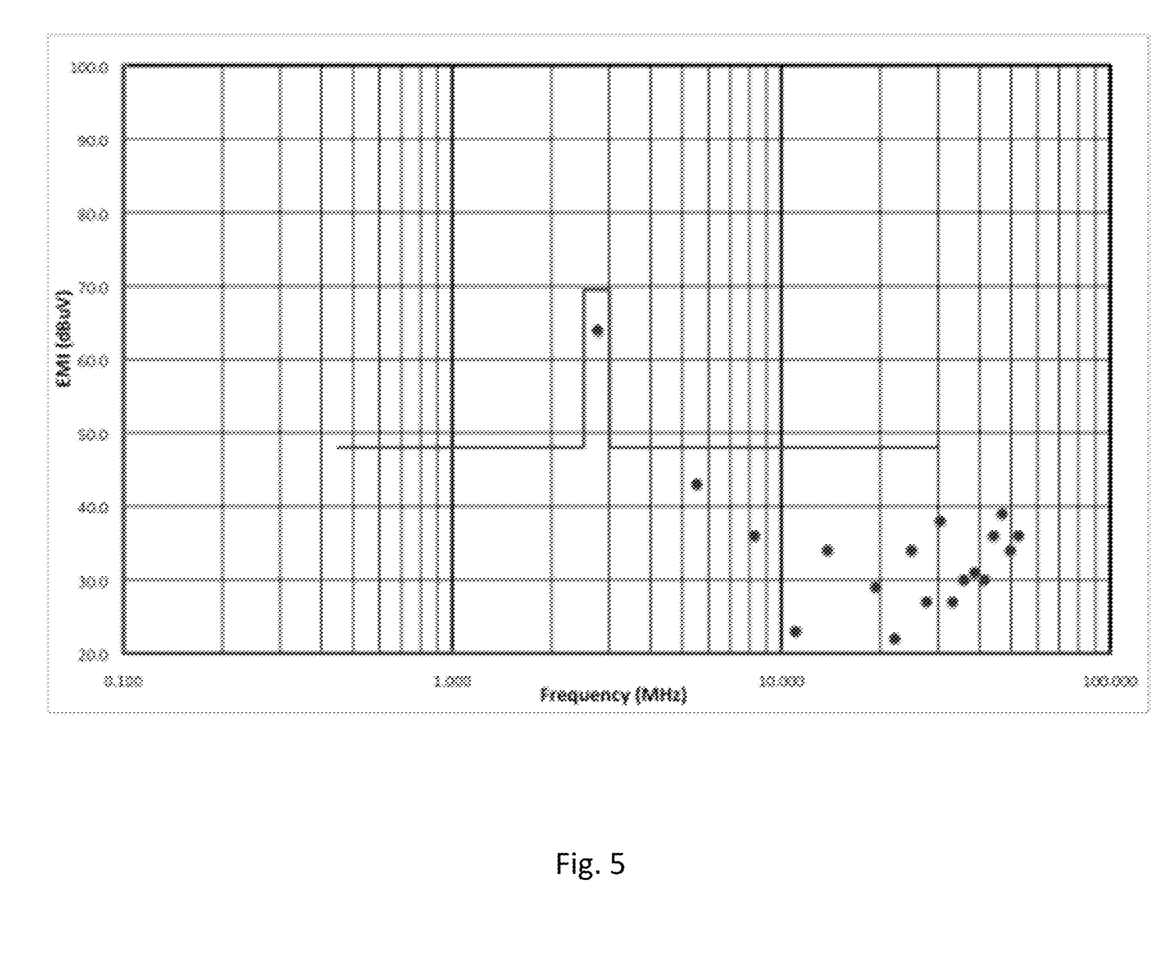
FIG. 5 provides experimental data of conductive EMI (points) and the allowed limits (lines) taken with a related art lamp using a LISN set up.
Figure 6:
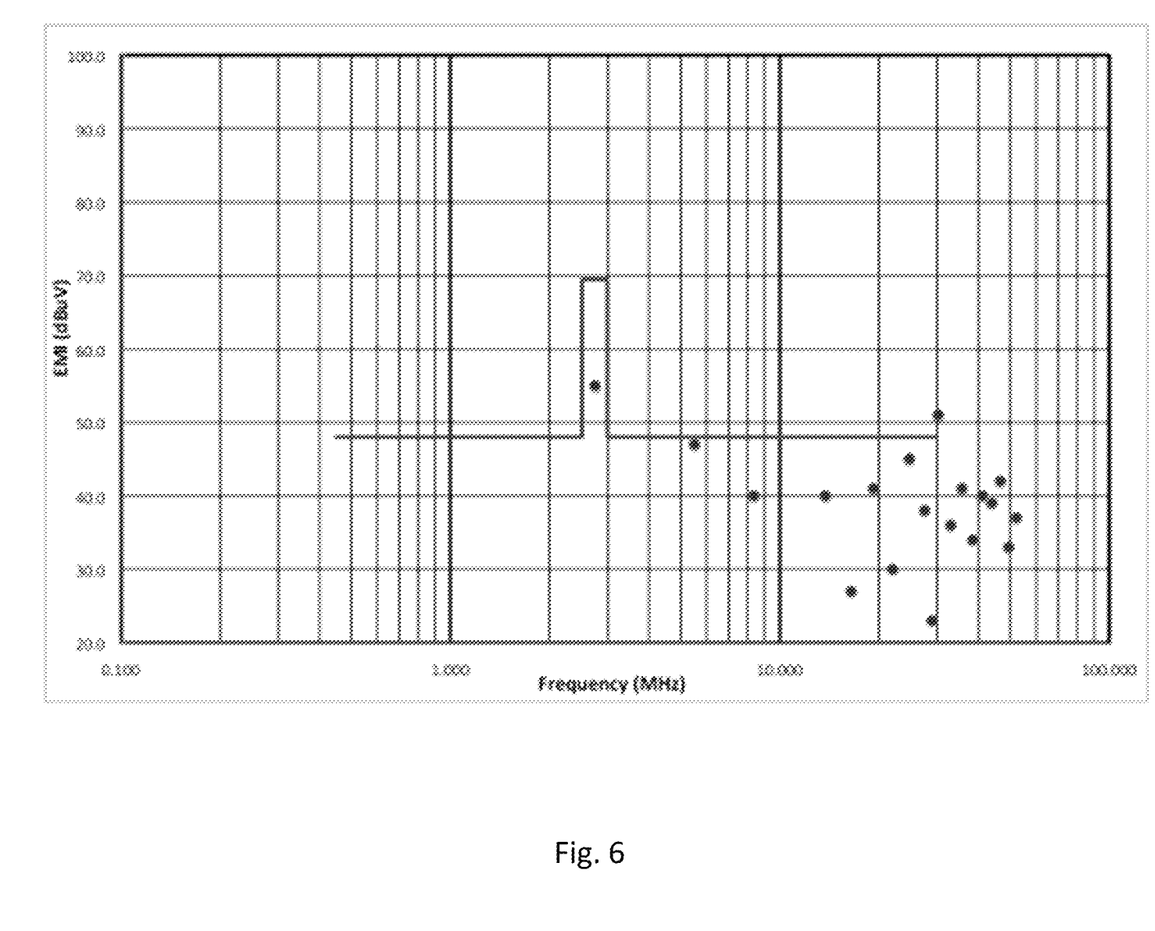
FIG. 6 provides experimental data of conductive EMI (points) and the allowed limits (lines) taken with the test lamp accordance to an exemplary and non-limiting embodiment.

FIGS. 5 and 6 show the FCC Part 18 limit line on plots of measured data for the two lamps. The horizontal axes are frequency in MHz and the vertical axes are the amplitudes of the measured EMI on a log scale in units of dBuV, or dB above 1 uV. The construction of couplers impacts the response vs. frequency, and the two different couplers were not expected to have identical EMI patterns vs. frequency. What is important is that both couplers have relatively low EMI that is capable of complying with the FCC's technical limits for Part 18 EMI. Although not shown, couplers without EMI reducing features will exceed the FCC's limits considerably. The main operating frequency of the electronic circuit powering the coupler is near a frequency of 2.75 MHz. As shown there is a "chimney" on the limit line between 2.5 and 3.0 MHz. where increased EMI is allowed. It should be noted that in this chimney, the generated EMI could be quite large. Exemplary embodiments lower the EMI in this chimney, as shown in FIG. 6 relative to that shown in FIG. 5.

The results of different steps discussed above were separately tested on this set-up, and confirmed for their effectiveness. When these steps were incorporated together in the final RF lamp embodiment, its EMI level was similar to that of the commercial lamp, and both were considerably lower than the regulation threshold. Thus, the measured values of the lamp surface voltage, for the newly invented lamp and commercial one were 0.58 V and 0.48 V peak-to-peak respectively, values well under the required limitations from the FCC for conductive EMI.

While only a few exemplary embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

All documents referenced herein are hereby incorporated by reference.

What is claimed is:

1. An induction radio frequency (RF) fluorescent lamp, comprising:
    a lamp envelope with a re-entrant cavity both covered on a partial vacuum side with phosphor and filled with a working gas mixture;
    a tubular ferromagnetic core on a non-vacuum side of said re-entrant cavity, wherein one or more radial spacers support the tubular ferromagnetic core to be axial to the re-entrant cavity with a fixed air gap between them;
    two windings on said tubular ferromagnetic core having a different number of turns, a first winding being an active winding having one end connected to an RF ballast and the other end connected to local ground and a second winding being a passive winding having one end grounded and the other end free.

2. The lamp of claim 1, wherein the one or more spacers are made of a high temperature resistant material having a melting point of approximately 150 C. or higher.

3. The lamp of claim 1, wherein a top spacer and a bottom spacer are of different shapes.

4. The lamp of claim 1, wherein a top spacer and a bottom spacer are of different materials.

5. The lamp of claim 1 wherein a separation between the windings and the non-vacuum side of the re-entrant cavity wall is in the range from approximately 0.1 mm to 1.5 mm.

6. The lamp of claim 1, wherein the RF end of the first winding connecting it to the ballast is adjacent to and between the grounded ends of both windings.

* * * * *

UNITED STATES PATENT AND TRADEMARK OFFICE
CERTIFICATE OF CORRECTION

PATENT NO. : 8,698,413 B1  Page 1 of 1
APPLICATION NO. : 13/684665
DATED : April 15, 2014
INVENTOR(S) : Valery A. Godyak et al.

It is certified that error appears in the above-identified patent and that said Letters Patent is hereby corrected as shown below:

In the Claims

In column 8, line 13, in claim 2, delete "150 C." and insert -- 150° C. --, therefor.

Signed and Sealed this
Twenty-second Day of July, 2014

Michelle K. Lee
*Deputy Director of the United States Patent and Trademark Office*